(12) United States Patent
Dolman (10) Patent No.: US 6,796,589 B2
(45) Date of Patent: Sep. 28, 2004

(54) BARRIER

(76) Inventor: Terence James Dolman, c/o Trojan Hardware & Designs Ltd., Commerical Road, Walsall, West Midlands (GB), WS2 7NQ (*) Notice: Subject to any disclaimer, the term of this patent is extended or adjusted under 35 U.S.C. 154(b) by 0 days.

(21) Appl. No.: 10/255,074

(22) Filed: Sep. 26, 2002

(65) Prior Publication Data

US 2003/0057722 A1 Mar. 27, 2003

(30) Foreign Application Priority Data

Sep. 27, 2001 (GB) .............................................. 0123233

(51) Int. Cl.$^7$ ................................................ B60R 27/00
(52) U.S. Cl. .................................................. 296/24.43
(58) Field of Search ............................ 296/24.1, 24.2, 296/37.16, 24.31, 24.4, 24.43; 297/391; 119/496, 510, 516, 519, 523

(56) References Cited

U.S. PATENT DOCUMENTS 6,012,753 A    1/2000   Ordoyne et al.

2002/0030372 A1 * 3/2002 Moore et al. .............. 296/24.1

FOREIGN PATENT DOCUMENTS

| DE | 34 24 436   | 1/1985 |
| DE | 299 14 518  | 2/2000 |
| DE | 201 19 038  | 2/2002 |
| FR | 2 618 737   | 2/1989 |
| GB | 2 078 180   | 1/1982 |

* cited by examiner

Primary Examiner—Lori L. Coletta
(74) Attorney, Agent, or Firm—Nixon & Vanderhye P.C.

(57) ABSTRACT

A barrier 1 comprises stanchion members 2 and guard elements 3. The stanchion members 2 are secured to the guard members 3 using clips 4 in order to create a robust, substantially planar barrier to divide a vehicle cabin space. A rear seat of a motor vehicle incorporates a backrest 5 in which headrests are normally secured through sockets 6. Thus, when the headrests are removed, these sockets 6 become available to accommodate entry segments 7 of the stanchion members 2. This mounts the barrier 1 on the backrest 5. The barrier may be used to partition the luggage/cargo area from the remainder of the cabin.

19 Claims, 7 Drawing Sheets

_Fig. 7_

_Fig. 9_

_Fig. 14_

_Fig. 15_

BARRIER

The present invention relates to barriers and more particularly to barriers for use within vehicles to divide a vehicle cabin between passenger and luggage/cargo areas.

It is known to provide a barrier in a motor vehicle which extends from the floor to the ceiling of the vehicle cabin in order to partition the luggage/cargo area from the remainder of the cabin. Typically, such a barrier is installed behind the rearmost seats to allow a pet, such as a dog, to travel in the luggage/cargo area safely. In consequence, these barriers are typically referred to as dog guards.

Currently available barriers used as dog guards generally are arranged for stability to be substantially perpendicular to the vehicle floor and ceiling, and are secured by pressure on the floor and ceiling. Unfortunately, many vehicles incorporate an inclined rear bench seat which has a backrest at an angle, for passenger comfort. Thus, a perpendicular barrier will engage the top edge of a rear bench seat create wasted space between the point where the barrier engages the cargo/luggage area floor and the back of the rear seat.

In accordance with the present invention there is provided a barrier for use with a vehicle seat, the barrier comprising stanchion means associated with sockets in the seat and arranged to extend in use away from an upper edge of a vehicle seat, there being guard members extending between the stanchion means to form the barrier above the sockets.

Preferably, the sockets are those normally arranged to accommodate a seat headrest.

Preferably, the stanchion means is extendible axially to allow presentation of the barrier over a range of heights.

The stanchion means may include clamp means to clamp stanchions to struts secured in the sockets. These struts may form part of a vehicle head rest assembly. The clamp means may include a tubular member for locating around a strut, and a threaded gripping member mounted in the tubular member to be tightened to clamp the tubular member to the strut.

There may be lock detents operable to set the angle of the stanchion means relative to the sockets. The lock detents may include arms between which a stanchion means is located, and which may be drawn together to clamp the stanchion means. The arms may carry formations which are complementary to formations on the stanchion means, to form therewith an articulated arrangement. The said formations may limit the range of angles through which the stanchion means may be articulated relative to the sockets.

Possibly, respective adaptor members are provided to allow the stanchion means to be accommodated in a number of different socket sizes and/or types.

Preferably, the stanchion means are substantially straight and aligned in use with the sockets so that the barrier is in the same plane as a seat incorporating those sockets. Alternatively, the stanchion means may be angled relative to the sockets in use in order that the barrier can be presented substantially perpendicular to a roof surface of a vehicle incorporating the barrier.

Preferably, the guard members are extensible in order to substantially alter the cross-section of the barrier.

Advantageously, the guard members comprise at least hollow-ended crossbars secured to the stanchion means with slide elements associated with these crossbars so that these slide elements are laterally extensible. Typically, these slide elements comprise hoops secured to two or more crossbars.

The guard members may be adjustably attached to the stanchion means. The attachment arrangement may include a collar means around the stanchion means and guard member, and a cam member movable to tighten the collar means against the stanchion means and guard member to lock the said means and said member in position. The cam member may be a rotatable member carried by one of the stanchion means and guard member, and movable to bear against the other.

The invention also provides a barrier member for use within a vehicle and comprising stanchion means carrying guard members, the guard members being adjustably attached to the stanchion means.

The attachment arrangement may include a collar means around the stanchion means and guard member, and a cam member movable to tighten the collar means against the stanchion means and guard member to lock the said means and said member in position. The cam member may be a rotatable member carried by one of the stanchion means and guard member, and movable to bear against the other.

An embodiment of the present invention will now be described by way of example only with reference to the accompanying drawings in which.

Figure 1:
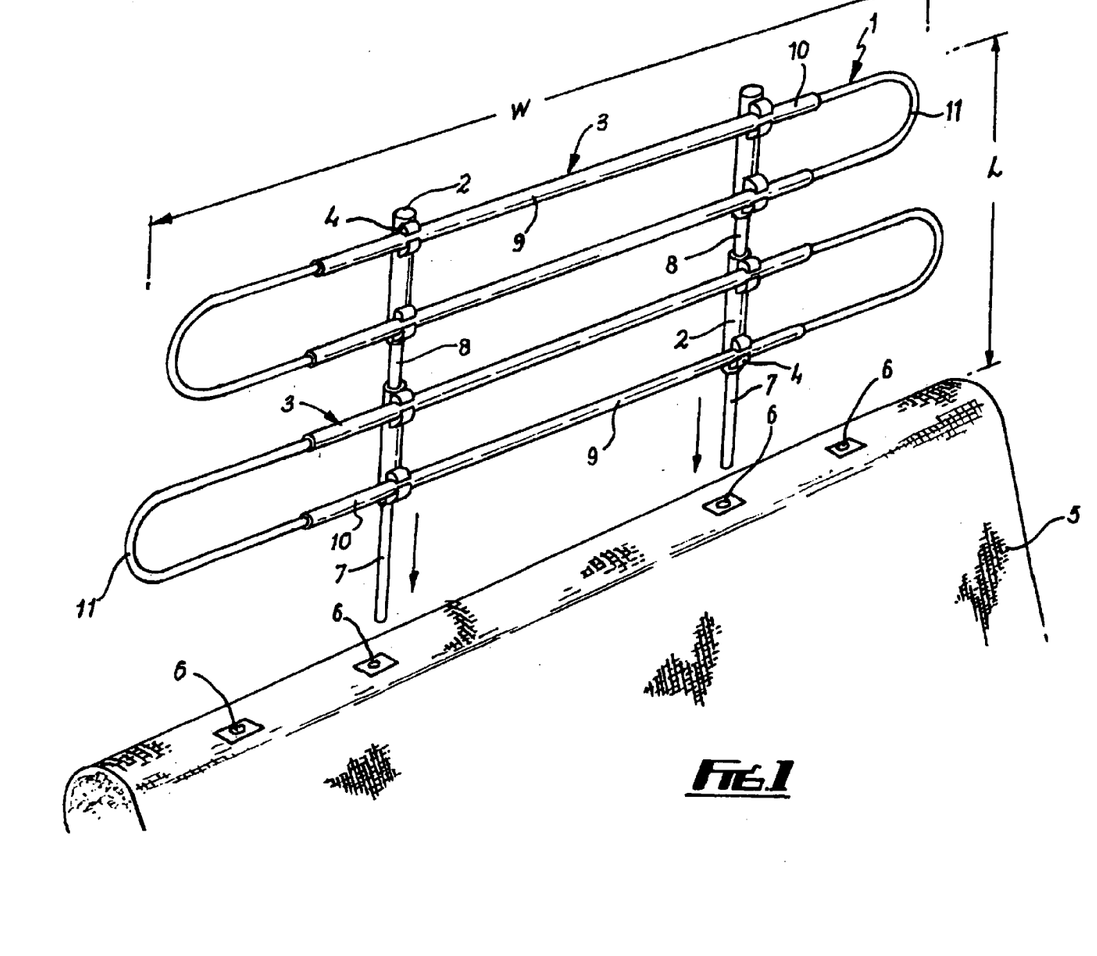
FIG. 1 is a perspective view of a simple version of a barrier according to the present invention.
Figure 2:
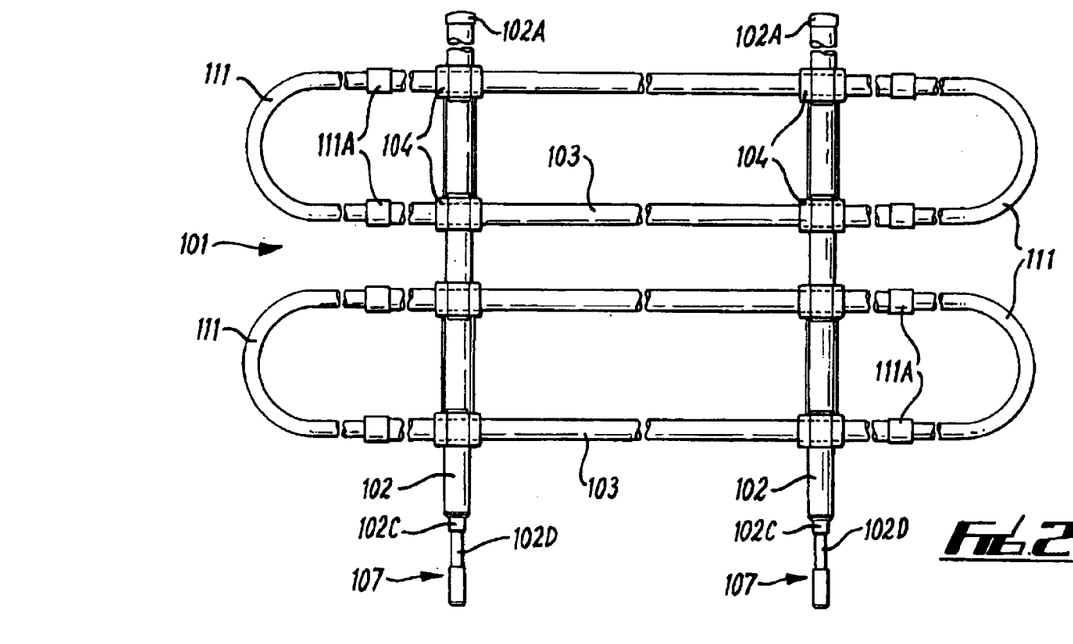
FIGS. 2, 3 and 4 are, respectively, front elevation, side elevation and plan views of an alternative embodiment of the invention, with FIG. 3 on an enlarged scale.
Figures 3, 5:
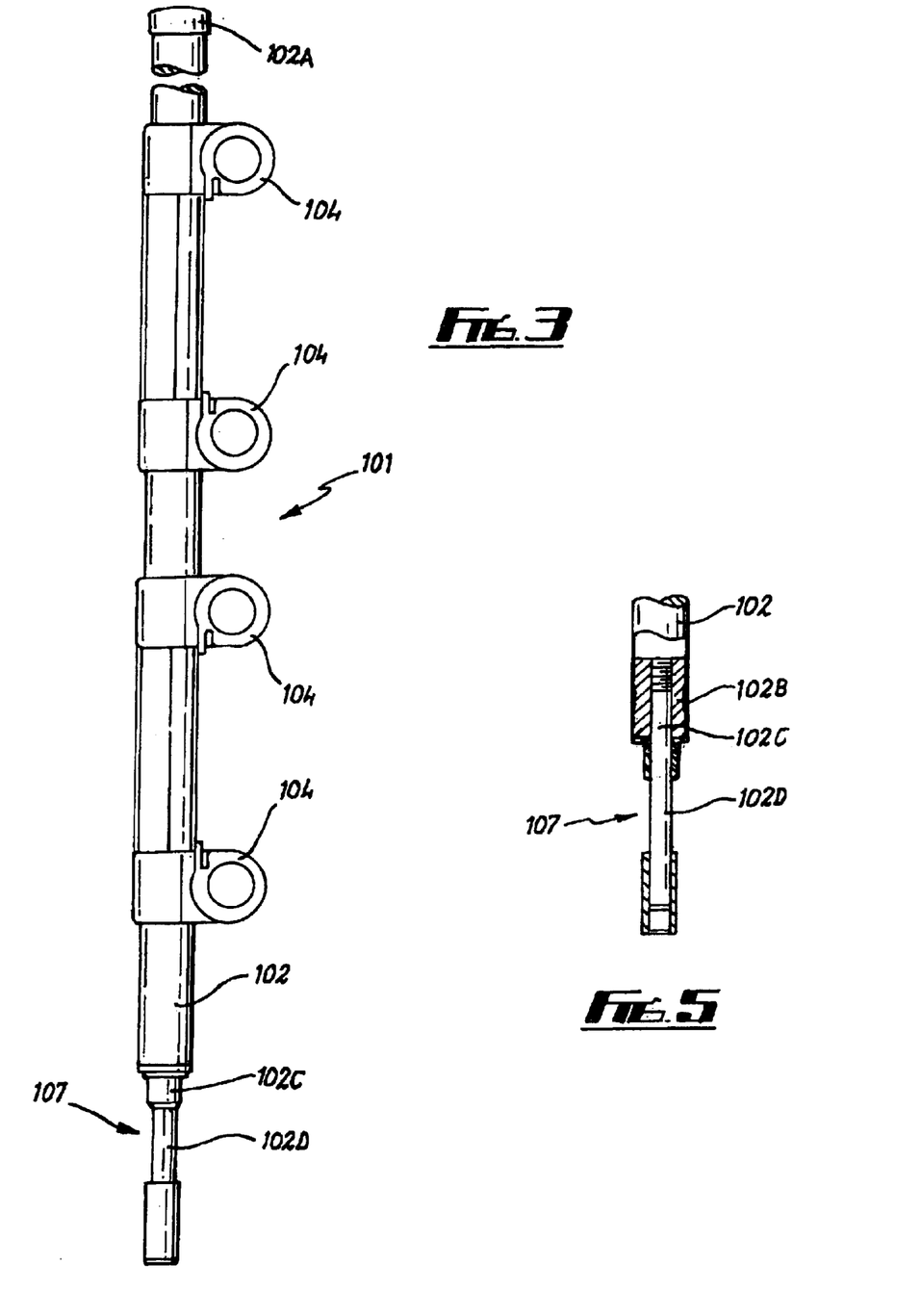
FIG. 5 is a partial section of part of the arrangement of FIGS. 2 to 4, on the same scale as FIG. 3.
Figure 4:
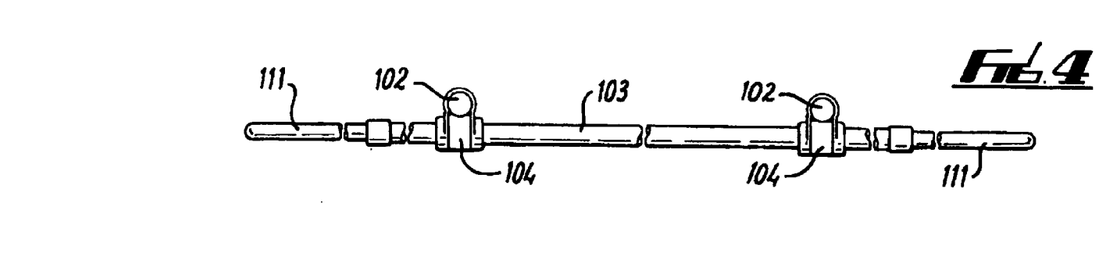

Referring to FIG. 1, a barrier 1 comprises stanchion members 2 and guard elements 3. The stanchion members 2 are secured to the guard members 3 using clips 4 in order to create a robust substantially planar barrier to divide a vehicle cabin space. A rear seat of a motor vehicle incorporates a backrest 5 in which headrests are normally secured through sockets 6. Thus, when the headrests are removed these sockets 6 become available to accommodate entry segments 7 of the stanchion members 2. The entry segments 7 are forced in the direction of arrowheads into the sockets 6 so that lock detents in these segments 7 engage these sockets 6 as required to robustly secure the barrier 1 relative to the backrest 5. It is important that each segment 7 and therefore the stanchions 2 are robustly located in the backrest 5 as the barrier 1 may be forced to restrain the considerable momentum of a dog or luggage if a vehicle is rapidly decelerated or is involved in a collision.

The stanchion members 2 are expandable in an axial direction relative to these sockets 6 in order to vary the height h relative to the seat backrest 5. The barrier 1 will typically fill the space between the top of the backrest 5 and the vehicle roof (not shown). In order to provide such axial expansion the stanchion members 2 will typically be telescopic with expansion sections 8 entering and exiting hollow tubular parts of the stanchion members 2. Locking means, such as detents and grips, are provided to resiliently retain the stanchion members 2 in their expanded state as required.

Alternatively, the stanchion members may be provided in different lengths to suit different vehicles.

The guard members 3 will generally allow a lateral expansion relative to the seat back 5 such that the width w can be varied to various seat back 5 widths and vehicle dimensions. Typically, the guard members 3 will substantially fill the space between the ends of the seat back 5. In order to allow lateral expansion the guard members 3 will include crossbars 9 secured to the stanchion members 2 and having at least hollow ends 10 into which slide elements 11 extend. These slide elements 11 enter and exit the ends 10 in order to expand and contract the width w of the barrier 1. As shown in the figure the slide elements 11 typically comprise hoops which extend between two crossbars 9.

In order to form the barrier 1 in accordance with the present invention a conventional barrier designed to extend from the floor of a vehicle to its roof can be adapted by cutting off part of each stanchion member 2 and inserting a segment 7 into that truncated stanchion member 2. These segments 7 which engage the socket 6 can be secured to the truncated stanchion members 2 through a weld, friction-fit or adhesive coupling between them. In order to provide the necessary strength for the barrier 1, the segment 7 will normally enter a substantial part of a hollow portion of the stanchion member 2. Either a number of different segment 7 types, or adaptor inserts are provided, to allow the segments 7 to be appropriately secured in sockets 6 used by different vehicle or seat manufacturers to normally secure their headrests.

The barrier 1 through its stanchion members 2 can be arranged either to provide an extension of the seat back 5 substantially in the same plane as that seat back 5 or, through angling of the stanchion members 2, a barrier which is substantially perpendicular to a roof surface of a vehicle. Thus, the stanchion members 2 may be substantially straight where a barrier in the plane of the seat back 5 is required. Straight stanchion members 2 will be substantially aligned with the socket 6. Alternatively, the stanchion members 2 can be angled so that the barrier 1 is held in a perpendicular orientation with regard to a vehicle roof but out of the plane of a typically reclining seat back 5.

As indicated above, the stanchion members 2 may be permanently bent to an angle in order to present the barrier 1 as required. However, the stanchion members 2 can also be arranged to be articulated so that these members 2 can be bent to subtend an angle between a straight configuration and one to allow a perpendicular orientation of the barrier 1 relative to the vehicle roof. Such articulation in the stanchion members 2 can be achieved by incorporating a knuckle element about which the stanchion member 2 can be bent and secured over a fixed angular range.

The barrier 1 utilises the socket 6 normally within which a rear seat headrest is secured. Thus, the barrier 1 through the stanchion 2 and guard members 3 may accommodate a clip-on cushion or other element to provide a replacement headrest for rear seat passengers in a vehicle incorporating the barrier 1. These replacement headrest cushions will typically be located near to the upstanding stanchion members 2 to provide robust location. These replacement headrest cushions can be detachably clipped to the barrier 1 for adjustment or, if desired, permanently secured thereto.

The procedure with regard to securing the barrier 1 to a rear seat back in accordance with the present invention will typically involve tilting the seat forward to provide sufficient barrier 1 manipulation space to insert the stanchions 2 in the sockets 6. It will be understood that the segments 7 will generally enter to a significant depth the sockets 6 in order to provide robust location. In such circumstances, the entry length of the stanchion members 2 will necessitate positioning of the barrier 1 at least the length of the segments 7 in terms of height above the seat back 5. Typically, there will be insufficient space between the seat back 5 upper edge and the vehicle roof to allow simple location of the stanchion members 2 in the sockets 6. Tilting the seat back 5 forwards, or backwards if possible, will thereby increase the distance available between the top edge of the seat back 5 and the roof of the vehicle to allow the stanchion members 2 to be located above the socket 6 and then forced into engagement to secure the barrier 1 above the seat back 5. Once the barrier 1 is secured to the seat back 5 the seat is returned to its normal upright position.

FIGS. 2 to 5 show an alternative embodiment. Corresponding elements are given associated numerals, thus the barrier is designated 1 in FIG. 1 and 101 in FIG. 2. The stanchion is designated 2 in FIG. 1 and 102 in FIG. 2.

In the embodiment of FIGS. 2 to 5, the stanchions 102 of the barrier 101 are formed of plain tubes of fixed length, capped at their upper end 102A. At their lower end, the stanchion 102 is plugged at 102B to carry a short extension 102C formed to engage with a headrest socket by providing a neck region 102D. The stanchion 102 can therefore be readily adapted for different vehicles, by replacing the plug, extension and neck 102B,C,D.

The guard elements 103 are secured to the stanchions 102 by clips 104, which will be described more fully below, with reference to FIGS. 12 to 15.

The stanchion extensions 102C form the entry segments 107 for use as described above.

Lateral extension of the guard elements 103 is provided by slide elements 111 which have associated twist lock arrangements 111A, which can be twisted to lock the slide element 111 relative to the guard element 103.

The barrier 101 can be secured to a rear seat back in the manner described above, by inserting the entry segments 107 into respective sockets. The position and width of the guard can then be adjusted by means of the twist locks 111A and slide elements 111, and by adjustment by means of the clips 104, to be described.

Figure 6:
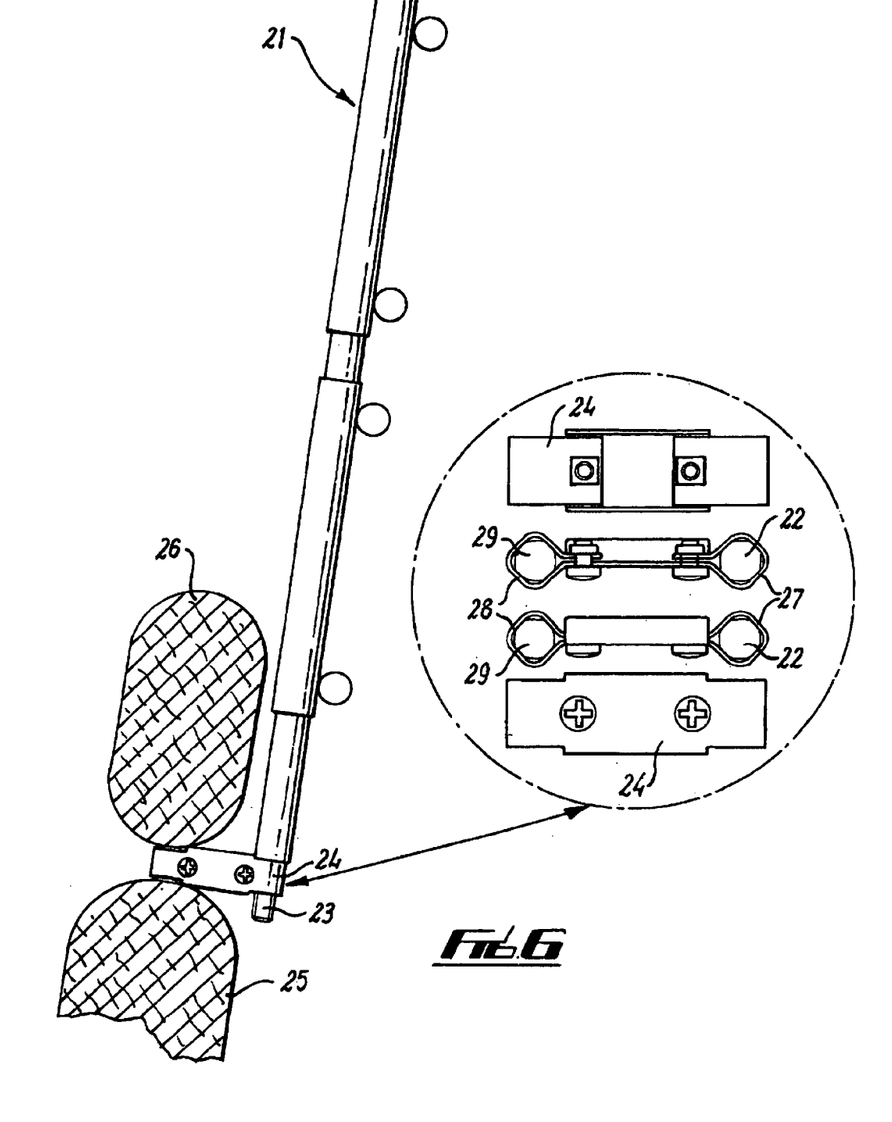
FIG. 6 is an alternative manner of securing a barrier relative to a vehicle seat.
Figure 7:
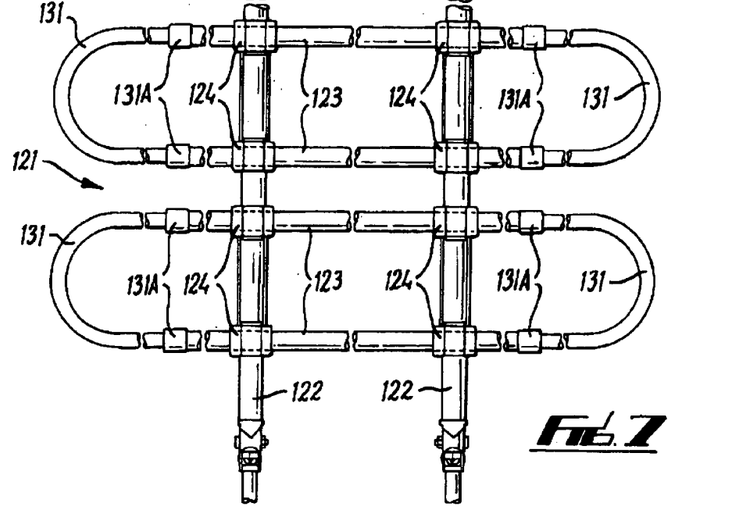
FIGS. 7, 8 and 9 correspond with FIGS. 2 to 4, showing a further alternative embodiment, with FIGS. 7 and 9 on a reduced scale.
Figure 8:
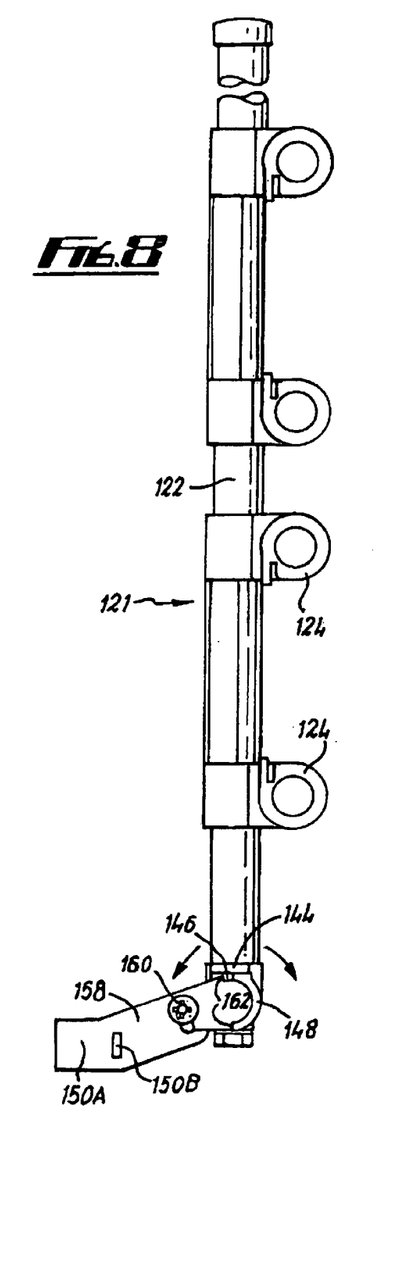
Figure 9:
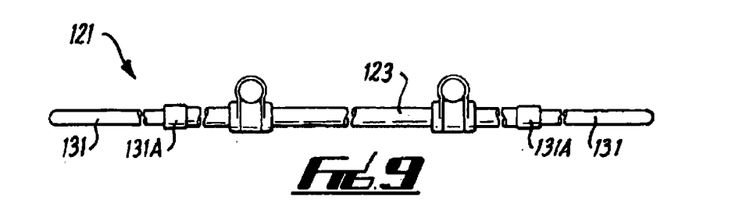

FIG. 6 shows an alternative manner of securing a barrier 21 above a seat back 25. A stanchion 22 is clamped and secured at one end 23 by a clamp member which itself connects and is coupled to a strut of a seat headrest assembly 26. Thus, the barrier 21 is presented above the seat back 25 behind the headrest of the headrest assembly 26.

The clamp member 24 as shown in the exploded drawing comprises two collar ends 27, 28 which respectively grip the stanchion 22 and a headrest support strut 29. A tight clamp grip is created in the collars 27, 28 by a nut and bolt tourniquet arrangement across such collar 27, 28.

The clamp member 24 itself as shown in FIG. 6 can be a straight element or curved or angled to present the stanchion 22 as described.

FIGS. 7 to 11 illustrate a further alternative embodiment. This differs from the arrangement of FIGS. 2 to 5 primarily in the detail at the bottom of each stanchion, which is a clamping arrangement similar to that illustrated in FIG. 6.

Thus, the barrier 121 is formed of stanchions 122 and guard elements 123, attached to the stanchions by clips 124, which are the same as the clips 104 in FIGS. 2 to 5. The guard elements 123 have slide elements 131 and twist lock arrangements 131A, corresponding with the elements and locks 111, 111A of FIGS. 2 to 5.

At the bottom of each stanchion 122, the open end of the stanchion 122 is plugged by a plug 140 (FIG. 11) which has an internally threaded bore to receive a bolt 142. The plug 140 may be secured in the stanchion 122 by friction, welding, adhesive or the like. The bolt 142 is used to secure a head member 144 to the plug 140 and thus to form a head of the stanchion 122. The head 144 extends to one side of the stanchion 122, having two generally planar flanks 146. Each flank 146 has a substantially semi-circular wall 148 projecting laterally.

A second element of the arrangement for securing the stanchion 122 to the headrest support strut 129 is a tubular member 150 formed by a channel region 150A closed by a plate 150B. The member 150 is located around the strut 129 as shown in particular in FIG. 10. A bolt 152 is mounted by means of the plate 150B, to advance or withdraw a clamp block 156 so that the tubular member 150 can be tightly clamped around the strut 129. Two arms 158 of the tubular member 150 then extend away from the strut 129 to embrace the stanchion head 144. The end of each arm 158 rests against a respective flank 146 of the head 144. A nut and bolt arrangement 160 allows the arms 158 to be tightened together to grip the head 144 by means of friction.

Figure 10:
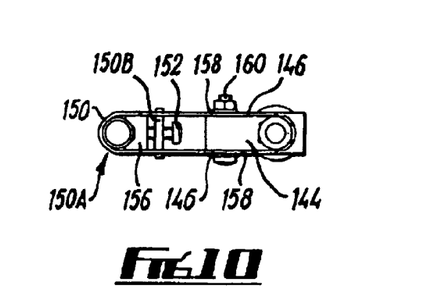
FIG. 10 is a base view of the fixing of the third arrangement.
Figure 11:
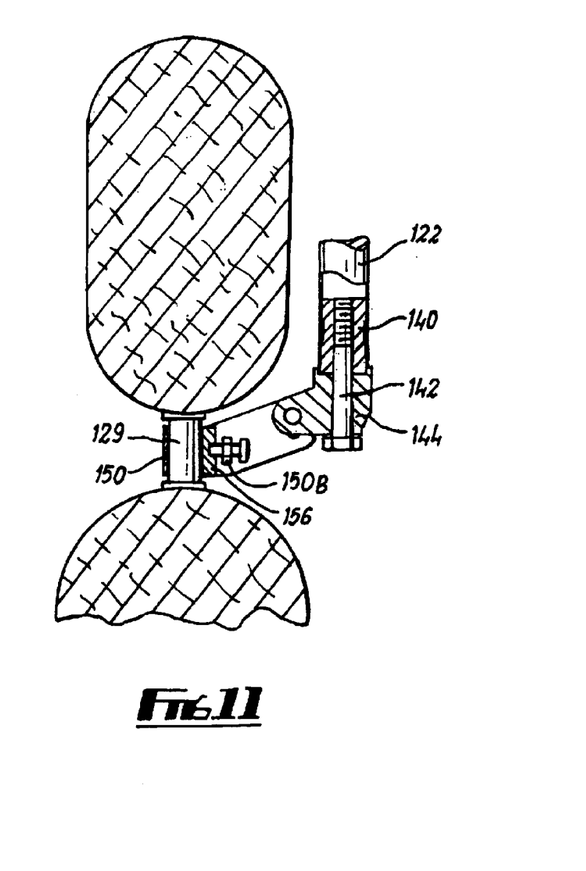
FIG. 11 shows the fixing in use, and partly in section.

The ends of the arms 158 have a part circular shape of longer circumferential length than the walls 148, finishing in a step 162 at each end. These steps 162 will abut the ends of the walls 148 to limit the angle through which the head 144 (and thus the stanchion 122) can be re-oriented about a generally horizontal axis, relative to the strut 129. The arms 158 are preferably complementary in form to the flanks 146, so that when the flanks 146 are being lightly gripped by the arms 158, an articulated joint is formed.

In this example, the nut and bolt arrangement 160 extends through a bore 164 in the head 144, in addition to passing through the arms 158. This further limits the degree of movement available.

The barrier of FIGS. 7 to 11 is installed by first locating the tubular member 150 around the strut 129 and tightening the bolt 152. This may require the headrest to be removed from the socket and subsequently replaced after positioning the tubular member 150. The stanchions 122 are then offered to the respective tubular members 150, to place the respective heads 144 between the arms 158. The nut and bolt arrangements 160 are then put into position and tightened sufficiently to form an articulated joint with the head 144. The barrier can then be tilted to the desired angle, before the nut and bolt arrangements 160 are fully tightened.

FIGS. 12 to 15 show, on an enlarged scale, arrangements for adjustably attaching the guard elements of the guards described above, to the stanchions. The arrangements to be described in relation to FIGS. 12 to 15 could be used in relation to any of the embodiments described above.

Figure 12:
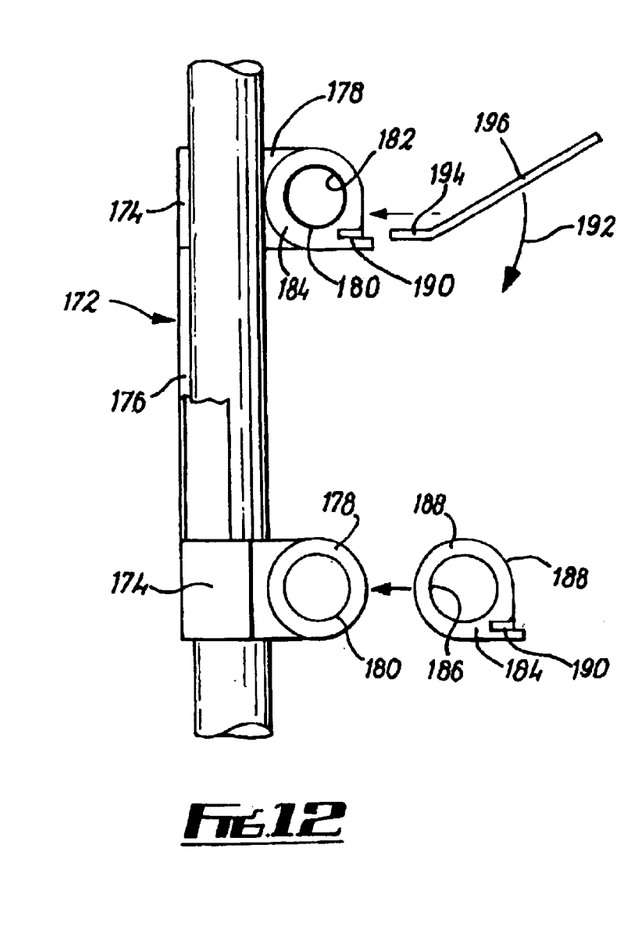
FIGS. 12 to 15 are, respectively, a partial side elevation, a front elevation, a plan view and a partial plan sectional view of a locking arrangement for the embodiments of FIGS. 2 to 11.
Figure 13:
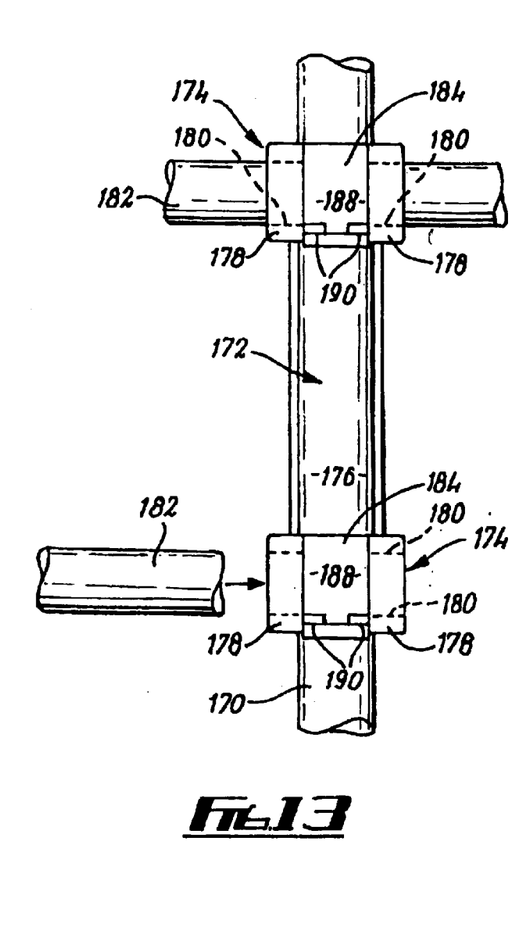
Figure 14:
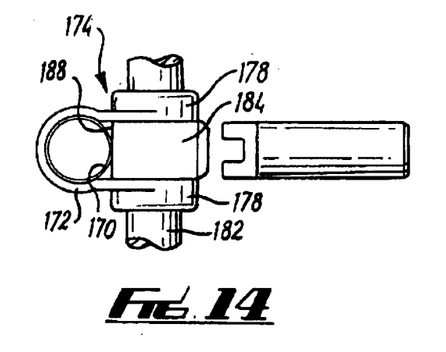
Figure 15:
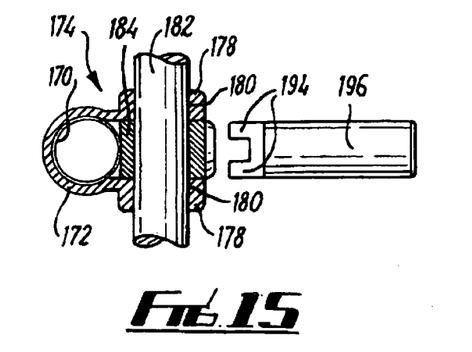

FIG. 12 shows a tube 170 which is the stanchion of any of the embodiments described above. The tube 170 carries a collar 172 which has two heads 174 connected by a web 176. Each head consists of two arms 178 which embrace the tube 170. Each arm 178 defines an eye 180 so that the pair of arms 178 together define a socket for receiving a second tube 182, perpendicular in direction to the tube 170. The second tube 182 is a tubular portion of a guard element of one of the guard embodiments described above.

Each pair of arms 178 has an associated cam collar 184. In FIG. 12, the arm and cam collar arrangement is shown disassembled at the bottom of the drawing, whereas the upper end of the collar 172 shows an assembled but part cut-away arrangement.

The cam collar is a generally ring-like member having a central circular passage 186 of the same diameter as the eyes 180, and an outer non-circular surface 188. Slots 190 are formed for receiving a tool to be described.

Once the collar 172 is in position around the tube 170, a cam collar 184 can be placed between each pair of arms 178 of the heads 174 and the second tube 182 can then be passed longitudinally through the eyes 180 and the passage 186. This prevents the cam collar 184 from moving out from between the arms 178.

When installed in this manner, the orientation of the cam collar 184 around the axis of the second tube 182 will determine the point of the outer surface 188 which is nearest the first tube 170. The outer surface 188 is non-circular. Consequently, the orientation of the cam collar 184 will determine whether or not any clearance exists between the surface 188 and the tube 170. The shape of the surface 188 is chosen so that the collar 184 can be turned (in the direction of the arrow 192 in FIG. 12) to press increasingly firmly against the tube 170, thereby locking the tube by providing a camming action which forces the tubes 170, 182 apart until friction between the tube 170 and the collar 172 causes the tube 182 to be securely held against movement along the tube 170.

The cam collar 184 preferably has two slots 190 for receiving two lugs 194 on a simple tool 196. The tool 196 can be used to turn the cam collar 184 to tighten or release the cam lock. Thus, the tool 196 can be used to release both cam locks, following which the collar 172 and tubes 182 can be slid along the tube 170 to the desired position, the cams 184 then being tightened by manipulation by the tool 196, to lock the collar 172 and tubes 182 at the chosen position along the tube 170.

It is envisaged that in addition to the use of the cam locking arrangement just described in the embodiments described above, the arrangement may also be used for adjusting the position of guard elements in a conventional guard.

Whilst endeavouring in the foregoing specification to draw attention to those features of the invention believed to be of particular importance it should be understood that the Applicant claims protection in respect of any patentable feature or combination of features therein before referred to and/or shown in the drawings whether or not particular emphasis has been placed thereon.

What is claimed is:

1. A barrier for use with a vehicle seat having sockets, the barrier comprising stanchion means associated with sockets in the seat and arranged to extend in use away from an upper edge of a vehicle seat, clamp means to clamp said stanchions to struts secured in said sockets, and lock detents operable to set the angle of the stanchion means relative to the sockets, said barrier further comprising guard members extending between the stanchion means to form the barrier above the sockets.

2. The barrier of claim 1, wherein said sockets are adapted to accommodate a seat headrest.

3. The barrier of claim 1, wherein said stanchion means is extendible axially to allow presentation of the barrier over a range of heights.

4. The barrier of claim 1, wherein said struts form part of a vehicle head rest assembly.

5. The barrier of claim 1, wherein said clamp means include a tubular member for locating around a strut, and a threaded gripping member mounted in said tubular member to be tightened to clamp the tubular member to the strut.

6. The barrier of claim 1, wherein said lock detents include arms between which said stanchion means is located, in use, and means operable to draw together the arms to clamp the stanchion means.

7. The barrier of claim 6, wherein said arms carry formations which are complementary to formations on said stanchion means, to form therewith an articulated arrangement.

8. The barrier of claim 7, wherein said formations limit the range of angles through which said stanchion means may be articulated relative to the sockets.

9. The barrier of claim 1, wherein respective adaptor members are provided to allow said stanchion means to be accommodated in a plurality of different socket sizes and types.

10. The barrier of claim 1, wherein said stanchion means are substantially straight and aligned in use with the sockets so that the barrier is in the same plane as a seat incorporating those sockets.

11. The barrier of claim 1, wherein said stanchion means are angled relative to the sockets in use in order that the barrier can be presented substantially perpendicular to a roof surface of a vehicle incorporating the barrier.

12. The barrier of claim 1, wherein said guard members are extensible in order to substantially alter the cross-section of the barrier.

13. The barrier of claim 1, wherein said guard members comprise at least hollow-ended crossbars secured to said stanchion means with slide elements associated with these crossbars so that these slide elements are laterally extensible.

14. The barrier of claim 13, wherein said slide elements comprise hoops secured to two or more crossbars.

15. The barrier of claim 1, wherein said guard members are adjustably attached to said stanchion means.

16. The barrier of claim 15, wherein an attachment arrangement includes a collar means around said stanchion means and said guard members, and a cam member movable to tighten the collar means against the stanchion means and said guard members to lock said stanchion means and said guard members in position.

17. The barrier of claim 16, wherein said cam member is a rotatable member carried by one of said stanchion means and said guard members, and movable to bear against the other.

18. A barrier member for use within a vehicle and comprising stanchion means carrying guard members, said guard members being adjustably attached to the stanchion means, wherein said guard members are attached by an attachment arrangement which includes a collar means around said stanchion means and said guard members, and a cam member movable to tighten the collar means against the stanchion means and said guard members to lock said stanchion means and said guard members in position.

19. The barrier member of claim 18, wherein said cam member is a rotatable member carried by one of said stanchion means and said guard members and movable to bear against the other.

* * * * *